US010253894B2

(12) United States Patent
Wada

(10) Patent No.: US 10,253,894 B2
(45) Date of Patent: Apr. 9, 2019

(54) FUEL TANK CHECK VALVE

(71) Applicant: NIFCO INC., Yokosuka-shi, Kanagawa (JP)

(72) Inventor: Toshio Wada, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/506,411

(22) PCT Filed: Jun. 18, 2015

(86) PCT No.: PCT/JP2015/003067
§ 371 (c)(1),
(2) Date: Feb. 24, 2017

(87) PCT Pub. No.: WO2016/031109
PCT Pub. Date: Mar. 3, 2016

(65) Prior Publication Data
US 2017/0254427 A1 Sep. 7, 2017

(30) Foreign Application Priority Data

Aug. 26, 2014 (JP) .................................. 2014-171362

(51) Int. Cl.
*F16K 15/03* (2006.01)
*B60K 15/04* (2006.01)
(Continued)

(52) U.S. Cl.
CPC ............ *F16K 15/033* (2013.01); *B60K 15/04* (2013.01); *B67D 7/04* (2013.01); *F02M 37/00* (2013.01);
(Continued)

(58) Field of Classification Search
CPC .... F16K 15/033; F16K 15/03; F16K 27/0227; B23P 15/002; B60K 2015/03269
(Continued)

(56) References Cited

U.S. PATENT DOCUMENTS 6,155,316 A 12/2000 Benjey
7,182,109 B2 2/2007 Kolberg
(Continued)

FOREIGN PATENT DOCUMENTS

CN 101408144 A 4/2009
CN 101734145 A 6/2010
(Continued)

OTHER PUBLICATIONS

Europe Patent Office, "Search Report for European Patent Application No. 15835022.3," dated Mar. 7, 2018.
(Continued)

*Primary Examiner* — P. Macade Nichols
(74) *Attorney, Agent, or Firm* — Manabu Kanesaka

(57) ABSTRACT

A fuel tank check valve, which can prevent one portion of a coil portion of a torsion coil spring from being stuck on a stepped portion of a pivot includes a cylindrical member defining a flow channel for a fuel fluid; a flap axially supported on the cylindrical member through a pivot; and a torsion coil spring urging the flap in a closing direction. The pivot includes a large diameter portion around which a coil portion of the torsion coil spring is wound; and a first small diameter portion and a second small diameter portion coaxial with each other, and projecting into a shaft hole provided in either one of the cylindrical member or the flap. The first small diameter portion adjacent to the large diameter portion is off-centered to a side where the torsion coil spring presses against the pivot relative to the large diameter portion.

10 Claims, 5 Drawing Sheets

(51) Int. Cl.
- *F02M 37/00* (2006.01)
- *B67D 7/04* (2010.01)
- *F16K 27/02* (2006.01)
- *B60K 15/03* (2006.01)

(52) U.S. Cl.
CPC .......... *F16K 15/03* (2013.01); *F16K 27/0227* (2013.01); *B60K 2015/03269* (2013.01); *B60K 2015/0461* (2013.01)

(58) Field of Classification Search
USPC .............................................. 137/527, 527.8
See application file for complete search history.

(56) References Cited

U.S. PATENT DOCUMENTS

| | | | | |
|---|---|---|---|---|
| 7,568,499 | B2* | 8/2009 | Kishi | F16K 15/033 137/527 |
| 8,403,001 | B2 | 3/2013 | Ishizaka | |
| 2004/0231728 | A1* | 11/2004 | Martin | B60K 15/04 137/527 |
| 2007/0012365 | A1 | 1/2007 | Kishi et al. | |
| 2008/0035214 | A1 | 2/2008 | McCormack et al. | |

FOREIGN PATENT DOCUMENTS

| | | |
|---|---|---|
| CN | 102135199 A | 7/2011 |
| CN | 202790712 U | 3/2013 |
| JP | 2001-263514 A | 9/2001 |
| JP | 2006-206042 A | 8/2006 |
| JP | 2007-008295 A | 1/2007 |
| JP | 2007-22216 A | 2/2007 |
| JP | 2008-290574 A | 12/2008 |
| JP | 2010-281438 A | 12/2010 |
| JP | 2015-143566 A | 8/2015 |
| WO | 2006/004443 A2 | 1/2006 |

OTHER PUBLICATIONS

PCT/ISA/210, "International Search Report for International Application No. PCT/JP2015/003067," dated Sep. 8, 2015.
China Patent Office, "Office Action for Chinese Patent Application No. 201580044369.5," dated Jun. 21, 2018.

* cited by examiner

FUEL TANK CHECK VALVE

RELATED APPLICATIONS

The present application is National Phase of International Application No. PCT/JP2015/003067 filed Jun. 18, 2015, and claims priority from Japanese Application No. 2014-171362, filed Aug. 26, 2014, the disclosure of which is hereby incorporated by reference herein in its entirety.

FIELD OF TECHNOLOGY

The present invention relates to a check valve used for a connection portion between a fuel tank and a refueling pipe.

BACKGROUND ART

In the fuel tank for an automobile, there is publicly known a technology wherein a tip of a refueling pipe connecting a refueling opening and the fuel tank is projected into the fuel tank, and a check valve (ICV: inlet check valve) is provided at an projected end thereof to suppress a backflow of a fuel liquid and fuel steam inside the fuel tank into a refueling opening side (for example, Patent Document 1).

A fuel tank check valve described in the Patent Document 1 comprises a cylindrical member (pipe); a flap (valve member) axially supported on the cylindrical member; and a torsion coil spring (spring) urging the flap in a closing direction. A pivot (supporting shaft) supporting the flap to open and close includes a tip portion inserted into a receiving hole provided in the cylindrical member; and an enlarged diameter portion on which a coil portion of the torsion coil spring is mounted. The enlarged diameter portion is provided so as to reduce a gap between an inner periphery of the coil portion and the pivot, and the pivot can hold the torsion coil spring without rattling.

PRIOR ART DOCUMENT

Patent Document

SUMMARY OF THE INVENTION

Problems to be Solved by the Invention

In the check valve described in the Patent Document 1, however, there is a stepped portion between the tip portion of the pivot and the enlarged diameter portion, so that in a case wherein the torsion coil spring moves in a shaft line direction of the pivot, one portion of the coil portion of the torsion coil spring is stuck on the stepped portion so as to have a possibility of operational failure of the check valve. On the other hand, in order to eliminate the stepped portion of the pivot, if a diameter of the tip portion is enlarged to the same diameter as the enlarged diameter portion, it is necessary to enlarge a shaft hole receiving the pivot as well. Hereupon, in order to ensure a space for enlarging the shaft hole, a problem that a flow channel cross-sectional area has to be reduced occurs.

In view of the aforementioned background, a main object of the present invention is to provide a fuel tank check valve preventing one portion of the coil portion of the torsion coil spring from being stuck on the stepped portion of the pivot, and capable of opening and closing the flap normally.

Means for Solving the Problems

In order to obtain the aforementioned object, the present invention is a fuel tank check valve (2) comprising a cylindrical member (6) defining a flow channel for a fluid; a flap (8) axially supported on the cylindrical member through a pivot (40) in order to open and close an opening on a fuel tank (16) side of the cylindrical member; and a torsion coil spring (10) including a coil portion (50) mounted on the pivot to urge the flap in a closing direction. The pivot includes a large diameter portion (48) around which the coil portion is wound; and a first small diameter portion (44) projecting into a shaft hole (60) provided in either one of the cylindrical member or the flap. Also, the first small diameter portion is adjacent to the large diameter portion, and is disposed by being off-centered to a side where the torsion coil spring presses against the pivot by a reaction force of an urging force to the flap, relative to the large diameter portion.

According to the structure, in the pivot on the side where the torsion coil spring presses, a stepped portion between the first small diameter portion and the large diameter portion is small so as to suppress one portion of the coil portion of the torsion coil spring from being stuck on the stepped portion of the pivot and engaged, and to prevent an operational failure of the flap. Also, the first and second small diameter portions have a small diameter relative to the large diameter portion so as to reduce a space for providing the shaft hole, and to ensure a flow channel cross-sectional area without enlarging an outer diameter of the cylindrical member.

In the aforementioned invention, it is preferable that outer peripheral faces of the large diameter portion and the first small diameter portion are positioned approximately on the same surface at the aforementioned pressing side.

According to the structure, in the pivot at the side where the torsion coil spring presses, there is no stepped portion between the first small diameter portion and the large diameter portion so as to prevent one portion of the coil portion of the torsion coil spring from being stuck on the stepped portion of the pivot and engaged, and the flap can smoothly open and close without having the operational failure.

In the aforementioned invention, it is preferable that the pivot is integrally formed on the cylindrical member side, and that the shaft hole is provided on the flap side.

The large diameter portion is provided, so that without using a material such as a metal and the like for the pivot, sufficient strength can be ensured. Consequently, both the pivot and the cylindrical member are made of a material such as resin and the like, and can be integrally formed in the same way as the present structure. According to the structure, compared to a case wherein the pivot is provided as a separate member, a die for forming a member can be simplified.

In the aforementioned invention, it is preferable that the cylindrical member is provided with a support column portion (32) projecting in a direction of a shaft line of the cylindrical member from one end side forming the opening, and that the pivot is integrally formed with the support column portion in such a way as to face a tangent direction relative to the cylindrical member.

According to the structure, the flap moved to a fully open position can be disposed at a position adjacent to a peripheral wall side relative to a center shaft of the cylindrical member so as to increase a flow channel cross-sectional area of a fuel fluid.

In the aforementioned invention, it is preferable that the pivot is formed in such a way as to extend toward right and left lateral sides from the support column portion; that the first small diameter portion is formed at one end, and a second small diameter portion (46) coaxial with the first small diameter portion is formed at the other end; and that the flap is provided with a pair of arms wherein the shaft hole is formed.

According to the structure, a structure of the member is simplified so as to allow the flap to be easily assembled to the cylindrical member as well.

In the aforementioned invention, it is preferable that a stopper (52) restricting the fully open position of the flap is provided in the support column portion.

According to the structure, the fully open position of the flap is restricted so as to prevent the operational failure by excessive opening of the flap or a damage to each member.

In the aforementioned invention, it is preferable that the shaft hole has a long hole extending in a direction orthogonal to a face of the opening when the flap is located at a closed position.

According to the structure, at the closed position of the flap, the flap can move in the direction orthogonal to an opening face, so that the flap moved to the closed position is urged evenly relative to a valve seat so as to improve a sealing property.

In the aforementioned invention, it is preferable that one extending end portion (64) of the torsion coil spring abuts against an outer periphery of the cylindrical member, and that the other extending end portion (66) of the torsion coil spring abuts against an outer face of the flap.

According to the structure, the flap can be urged in the closing direction with a simple structure.

Effect of the Invention

According to the present invention, one portion of the coil portion of the torsion coil spring is suppressed from being stuck on the stepped portion of the pivot and engaged so as to prevent the operational failure of the flap.

BEST MODES OF CARRYING OUT THE INVENTION

Hereinafter, an embodiment of a fuel tank check valve according to the present invention will be explained with reference to the drawings.

Figure 1:
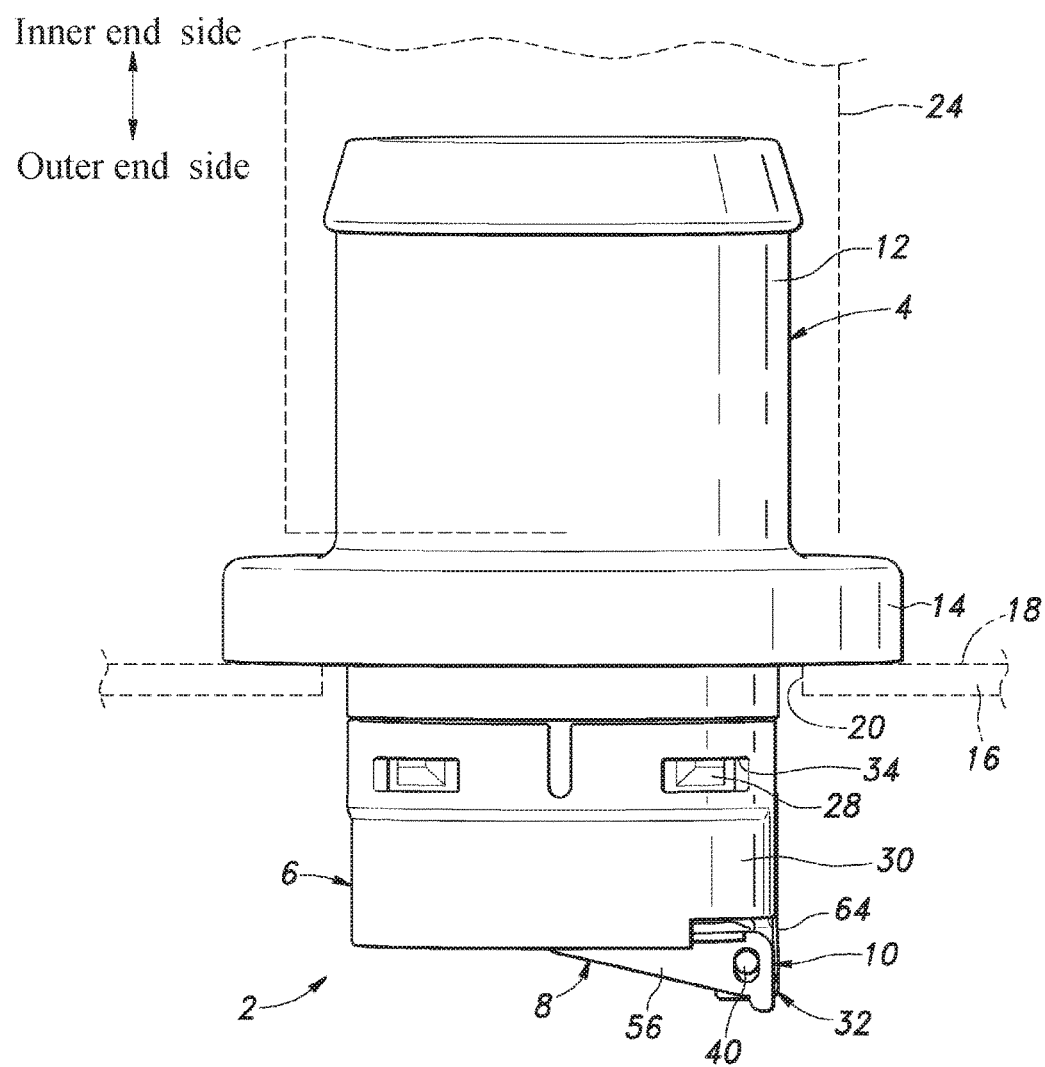
FIG. 1 is a front view of a check valve according to an embodiment.
Figure 2:
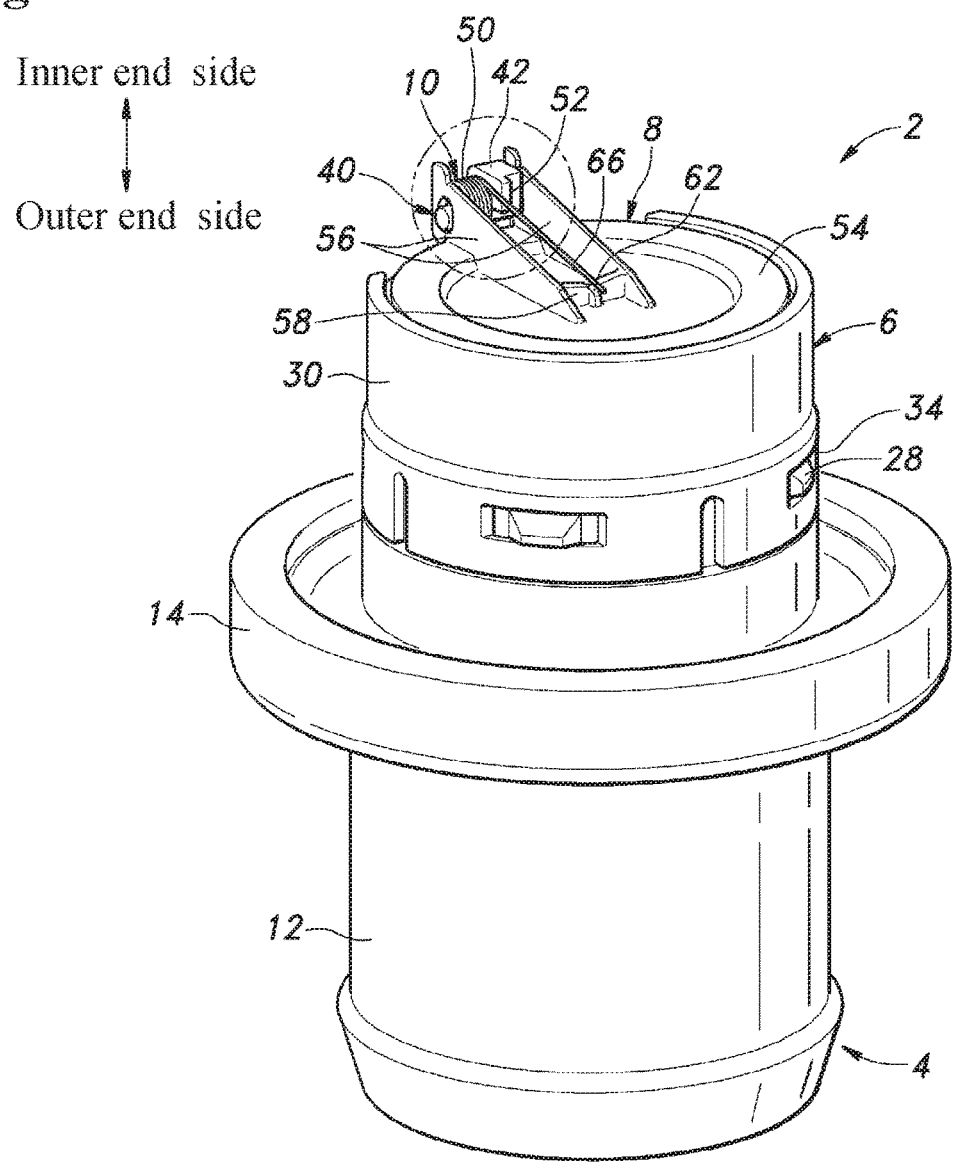
FIG. 2 is a perspective view of the check valve according to the embodiment.

As shown in FIG. 1 and FIG. 2, a check valve 2 comprises a cylindrical member 6 attached to one end side of a refueling pipe 4; a flap 8 attached to the cylindrical member 6; and a torsion coil spring 10 urging the flap 8 in a closing direction.

The refueling pipe 4 comprises a pipe main member 12 which is a circular pipe wherein both ends are open; and an annular flange 14 projected on an outer peripheral face of the pipe main member 12. The pipe main member 12 and the flange 14 are integrally formed by a resin material. As shown in FIG. 1, in the refueling pipe 4, one end side of the pipe main member 12 is inserted through a through hole 20 formed on a wall 18 of a fuel tank 16, and the flange 14 is welded in such a way as to abut against a peripheral edge of the through hole 20 which is an outer face of the wall 18 without passing through the through hole 20. With respect to an intermediate portion of the pipe main member 12, a side having an end portion disposed inside the fuel tank 16 is called an inner end side, and a side having an end portion disposed outside the fuel tank 16 is called an outer end side. In an inner end of the pipe main member 12, there is attached the check valve 2 opening and closing an inner hole of the pipe main member 12. At an outer end of the pipe main member 12, there is connected a flexible hose or pipe 24 communicating with a refueling opening (not shown in the drawings) receiving a refueling nozzle.

The outer end side of the pipe main member 12 is inserted into one end of the hose or the pipe 24. For example, a coronal band (not shown in the drawings) and the pipe main member 12 pinch the hose or the pipe 24 so as to fasten the pipe main member 12 and the hose or the pipe 24. On an outer peripheral face on the inner end side of the pipe main member 12, there is formed a plurality of cylindrical member engaging claws 28. In the present embodiment, four cylindrical member engaging claws 28 are provided at equal intervals (intervals of ninety degrees) in a circumferential direction.

Figure 5:
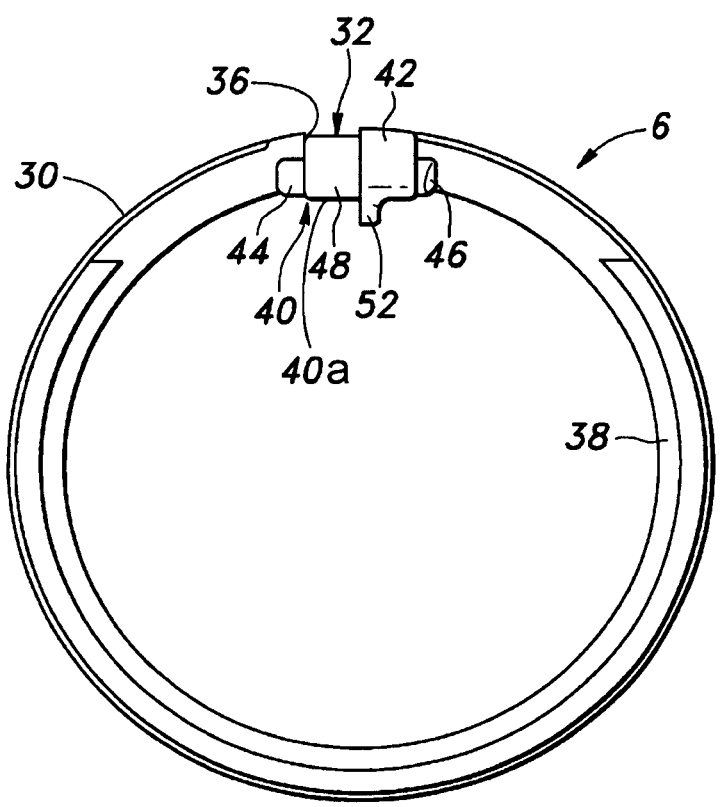
FIG. 5 is a bottom view of a cylindrical member according to the embodiment.

As shown in FIG. 1 and FIG. 2, the cylindrical member 6 includes a cylindrical main member 30 having a cylindrical shape wherein both ends are open; and a support column portion projecting in a shaft line direction of the cylindrical member 6 from an inner end side of the cylindrical main member 30. The cylindrical member 6 is formed by a resin material. In the cylindrical main member 30, there is provided an engagement hole 34 engaged with the cylindrical member engaging claw 28 of the refueling pipe 4. In the present embodiment, four engagement holes 34 are provided at equal intervals (intervals of ninety degrees) in the circumferential direction. The inner end side of the refueling pipe 4 is fitted into the outer end side of the cylindrical member 6, and the cylindrical member engaging claws 28 are engaged with the engagement holes 34, so that the cylindrical member 6 is attached to the refueling pipe 4. Also, as shown in FIG. 5, on an outer peripheral face of the cylindrical main member 30, there is provided a receiving groove 36 receiving a first extending end portion 64 of the later-described torsion coil spring 10 along the shaft line direction of the cylindrical member 6. On an inner peripheral side of an inner end of the cylindrical main member 30, there is formed a shoulder portion 38, and in the shoulder portion 38, there is attached a seal member (not shown in the drawings) such as an O-ring and the like in such a way as to form a valve seat.

Figure 3:
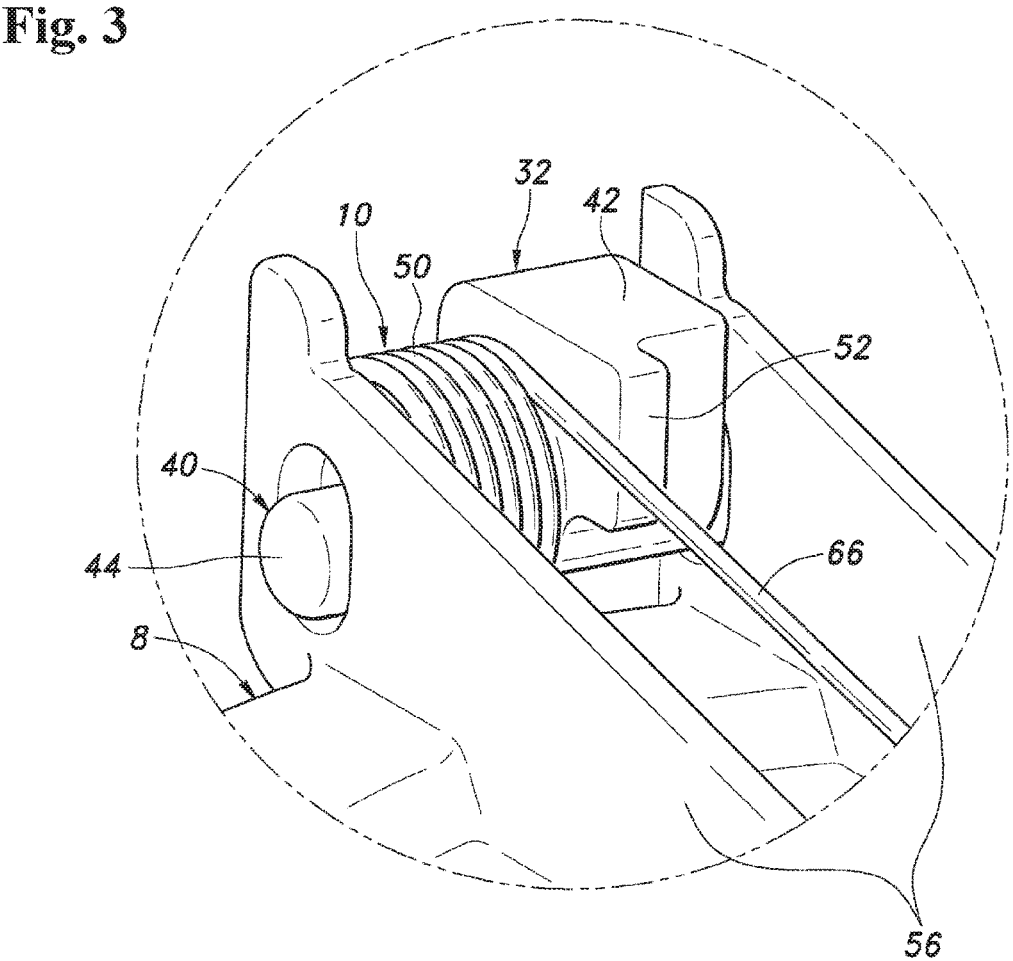
FIG. 3 is an enlarged perspective view of a shaft support structure in FIG. 2.
Figure 4:
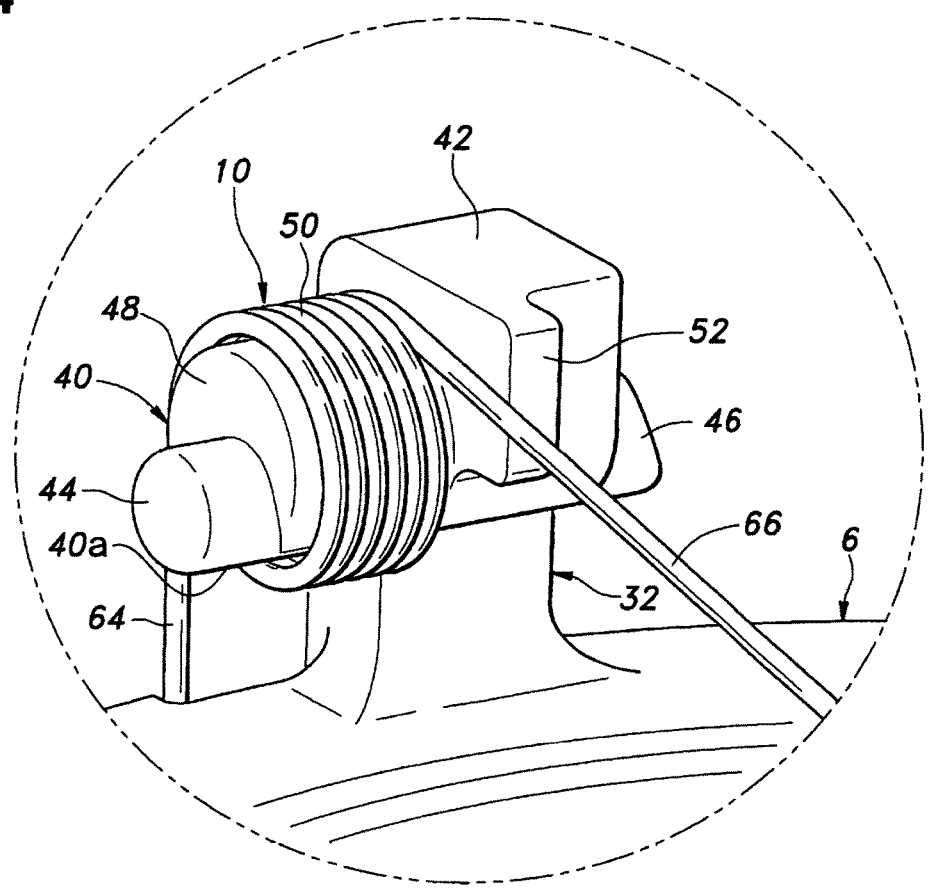
FIG. 4 is an enlarged perspective view wherein a flap of the shaft support structure in FIG. 2 is omitted.

The support column portion 32 is formed in such a way as to project in the shaft line direction of the cylindrical member 6 from a position adjacent to the receiving groove 36 on an outer peripheral side of the inner end of the cylindrical main member 30. As shown in FIGS. 3 to 5, on a projecting end side of the support column portion 32, there are provided a pivot 40 for supporting the flap 8 to be openable and closable; and a block portion 42 covering one portion on an inner end side of the pivot 40. The pivot 40 includes a first small diameter portion 44 formed at one end side; a second small diameter portion 46 formed at the other end side; and a large diameter portion 48 formed between the first small diameter portion 44 and the second small diameter portion 46, and adjacent to the first small diameter portion 44. The pivot 40 is disposed in such a way as to face a tangent direction relative to a peripheral wall of the cylindrical main member 30 at a position where the support column portion 32 is attached. The block portion 42 is disposed between the second small diameter portion 46 and the large diameter portion 48, and is disposed at a position matching to a base end side of the support column portion 32 in a shaft line direction of the cylindrical main member 30.

The large diameter portion 48 is disposed at a position matching to the receiving groove 36 in the shaft line direction of the cylindrical main member 30, and is inserted into a coil portion 50 in such a way as to support an inner peripheral face of the coil portion 50 of the torsion coil spring 10. A side face on a large diameter portion 48 side of the block portion 42 abuts against the torsion coil spring 10, and regulates the torsion coil spring 10 from moving to a second small diameter portion 46 side. In the block portion 42, there is formed a stopper piece 52 projected toward a central shaft of the cylindrical member 6. The stopper piece 52 abuts against an outer face of the flap 8 at a fully open position of the flap 8 so as to restrict the fully open position of the flap 8. The fully open position of the flap 8 is a position rotated approximately at ninety degrees around the pivot 40 from a closed position. The first small diameter portion 44 and the second small diameter portion 46 have the same diameter and are coaxial with each other; however, they have a small diameter relative to the large diameter portion 48, and are off-centered to a side where the torsion coil spring 10 presses against the pivot 40 (in the present embodiment, a right lower side on the drawing in FIG. 4). Here, the torsion coil spring 10 presses against the pivot 40 due to a reaction force of an urging force relative to the flap 8. Also, an outer peripheral face of the first small diameter portion 44 and an outer peripheral face of the large diameter portion 48 are positioned approximately on the same surface at the side where the torsion coil spring 10 presses.

A length in a shaft line direction of the first small diameter portion 44 is slightly longer than a length in a shaft line direction of the second small diameter portion 46. A free end of the second small diameter portion 46 is inclined such that a projection length becomes shorter toward an inside in a radial direction of the cylindrical main member 30. This is in order to allow the flap 8 to be easily attached to the cylindrical member 6 as described later.

As shown in FIG. 1 and FIG. 2, the flap 8 includes a disk-shaped flap main member 54; a pair of arms 56 projected on an outer face of the flap main member 54; and a spring support piece 58 disposed between the pair of arms 56 and projected on the outer face of the flap main member 54. The flap 8 is a molded article made of a resin material, and is axially supported on the cylindrical member 6 to be capable of opening and closing an opening on an inner end side of the cylindrical member 6.

When the flap 8 is located at the closed position, a diameter of the flap main member 54 is larger than an inner diameter of the cylindrical main member 30 and an inner diameter of the seal member (not shown in the drawings), and is smaller than an outer diameter of the cylindrical main member 30 in such a way as to seal the opening on the inner end side of the cylindrical member 6 from the fuel tank 16.

The pair of arms 56 has approximately a right angled triangle shape in a front view respectively, is formed by a flat plate having elasticity, and is disposed in parallel to each other. In the closed position of the flap 8, one side of the right angled triangle shape of the pair of arms 56 extends along the outer face of the flap main member 54 from a vicinity of a center of the flap main member 54 to the outer peripheral face of the cylindrical main member 30, and one side orthogonal to this extends along the shaft line direction of the cylindrical member 6 approximately along an extension face of the outer peripheral face of the cylindrical main member 30. In the pair of arms 56, there is provided one shaft hole 60 passing through in such a way as to be orthogonal to the flat plate respectively on an outer peripheral end side. A free end of the first small diameter portion 44 of the pivot 40 projects into a first shaft hole 60*a* of one arm 56, and the free end of the second small diameter portion 46 of the pivot 40 projects into a second shaft hole 60*b* of the other arm 56. Thus, both ends of the pivot 40 project into a pair of shaft holes 60 and are supported, so that the flap 8 is axially supported on the cylindrical member 6 to be capable of opening and closing the opening on the inner end side of the cylindrical member 6. The arm 56 including the first shaft hole 60*a* regulates a movement of the torsion coil spring 10 to a first small diameter portion side. Incidentally, the pair of shaft holes 60 has a long hole, and an extension direction thereof is a direction orthogonal to the flap main member 54, i.e. a direction orthogonal to an opening face on the inner end side of the cylindrical member 6 at the closed position of the flap 8. Consequently, the flap 8 can move in such a way as to be approximately orthogonal to the valve seat at a vicinity of the closed position, and is urged evenly relative to the valve seat so as to seal properly.

The spring support piece 58 is projected from a vicinity of a center of the outer face of the flap main member 54, and both side faces thereof connect to the pair of arms 56. A projection height of the spring support piece 58 is approximately equal to a height of the pair of arms 56 at that position. At a projection end of the spring support piece 58, there is provided a groove-like concave portion 62 in parallel to the extension direction of the pair of arms 56.

The torsion coil spring 10 includes the coil portion 50 formed by winding a metal wire material; and the first extending end portion 64 and a second extending end portion 66 extending from the coil portion 50. The coil portion 50 is disposed in such a way as to surround the large diameter portion 48 of the pivot 40, and the first extending end portion 64 is received in the receiving groove 36 of the cylindrical member 6, and abuts against an outer peripheral face of the cylindrical member 6. Also, the second extending end portion 66 extends along a hypotenuse of the right angled triangle shape of the pair of arms 56 approximately in the front view, and a vicinity of a free end thereof is received in the concave portion 62 of the spring support piece 58 of the flap 8, and abuts against the outer face of the flap 8. When the torsion coil spring 10 is disposed in this manner, the torsion coil spring 10 is formed in such a way as to exhibit an urging force such that the first extending end portion 64 and the second extending end portion 66 come close to each other, and urges the flap 8 in the closing direction. Also, at that time, the torsion coil spring 10 receives the reaction force of the urging force from the cylindrical member 6 and the flap 8 in the first extending end portion 64 and the second extending end portion 66, so that the coil portion 50 presses against a face 40*a* of the pivot 40 from a side facing the cylindrical main member 30 of an outer peripheral face of the pivot 40 to a side facing an inside of the cylindrical member 6 in an axial direction.

Next, a procedure of assembling the flap 8 and the torsion coil spring 10 to the cylindrical member 6 will be explained. First, the coil portion 50 of the torsion coil spring 10 is mounted on the large diameter portion 48 of the pivot 40 of the cylindrical member 6, and the first extending end portion 64 of the torsion coil spring 10 is received in the receiving groove 36 of the cylindrical member 6. Next, a free end side of the second extending end portion 66 of the torsion coil spring 10 is received in the concave portion 62 of the flap 8. Next, the free end of the first small diameter portion 44 of the pivot 40 is inserted into the first shaft hole 60a, and further, the arm 56 wherein the second shaft hole 60b is formed is moved to slide while elastically deforming along an inclined free end face of the second small diameter portion 46, and the free end of the second small diameter portion 46 is inserted into the second shaft hole 60b.

In the check valve 2 according to the present embodiment, at a side where the coil portion 50 of the torsion coil spring 10 presses against the large diameter portion 48 of the pivot 40, the first small diameter portion 44 and the large diameter portion 48, which are adjacent to each other, are positioned approximately on the same surface, and there is no stepped portion therebetween. Consequently, even if the coil portion 50 shifts to a first small diameter portion 44 side in an axial direction of the pivot 40, deformation by the stepped portion is prevented, and a failure in opening and closing operation of the flap 8 which may occur due to the deformation by the stepped portion can be prevented.

Also, the shaft hole 60 receiving the first small diameter portion 44 and the second small diameter portion 46 of the pivot 40 is formed by the long hole orthogonal to the opening face of the cylindrical member 6 at the closed position of the flap 8, and a spring force of the torsion coil spring 10 acts at the vicinity of the center of the flap main member 54. Consequently, the flap 8 is urged in a direction approximately orthogonal to the opening face at the closed position, and presses the whole seal member by an equal force so as to ensure an excellent sealing property.

The specific embodiment has been explained in the above; however, the present invention is not limited to the aforementioned embodiment, and can be modified widely. For example, the whole pivot, or the first and second small diameter portions inside the pivot may be a component made of a metal material. Also, using a torsion coil spring wherein an urging direction is a direction where a pair of extending end portions is separated from each other, the first extending end portion may be supported on an inner peripheral face of a support piece projecting to the inner end side from the cylindrical main member, so that the flap may be urged in the closing direction. At that time, the coil portion of the torsion coil spring presses against a face from a side facing the cylindrical main member on the outer peripheral face of the pivot to a side facing an outside in the radial direction of the cylindrical member, so that an off-centered direction of the first and second small diameter portions relative to the large diameter portion is a direction thereof as well. Also, the pivot may be provided in the flap, and the shaft hole of the pivot may be provided in the cylindrical member. Also, the pivot may be formed as a separate member from the cylindrical member and the flap, and the shaft hole of the pivot may be provided on both the cylindrical member and the flap. In that case, there may be provided one arm including one shaft hole of the cylindrical member and the flap, and the arm may be disposed between the pair of arms including the other shaft hole. Also, the cylindrical member may be integrally formed with the refueling pipe.

EXPLANATION OF SYMBOLS

2 . . . a check valve, 6 . . . a cylindrical member, 8 . . . a flap, 10 . . . a torsion coil spring, 32 . . . a support column portion, 36 . . . a receiving groove, 40 . . . a pivot, 44 . . . a first small diameter portion, 46 . . . a second small diameter portion, 48 . . . a large diameter portion, 50 a coil portion, 52 . . . a stopper piece, 56 . . . arms, 58 . . . a spring support piece, 60 . . . shaft holes, 62 a concave portion, 64 . . . a first extending end portion, 66 . . . a second extending end portion

What is claimed is:

1. A fuel tank check valve, comprising:
    a cylindrical member defining a flow channel for a fluid and having an opening at one end thereof;
    a flap axially supported on the cylindrical member;
    a pivot provided in one of the cylindrical member or the flap to rotate the flap thereon in order to open and close the opening of the cylindrical member;
    shaft holes provided in another of the cylindrical member or the flap, in which the pivot is inserted; and
    a torsion coil spring including a coil portion mounted on the pivot to urge the flap in a closing direction,
    wherein the pivot includes a large diameter portion around which the coil portion is wound, a block portion arranged adjacent to the large diameter portion to regulate movement of the torsion coil spring, a first small diameter portion projecting outwardly from a side of the large diameter portion opposite to the block portion into one of the shaft holes, and a second small diameter portion projecting in a direction opposite to the first small diameter portion from a side of the block portion opposite to the large diameter portion into another of the shaft holes, and
    the first small diameter portion is arranged to be off-centered to an outer peripheral face of the large diameter portion so that the torsion coil spring presses substantially against the outer peripheral face of the large diameter portion extending from a side facing the cylindrical member to a side facing an inside of the cylindrical member in an axial direction, and the torsion coil spring presses against the first small diameter portion when the torsion coil spring shifts to a side of the first small diameter portion in the axial direction of the pivot.

2. The fuel tank check valve according to claim 1, wherein the outer peripheral face of the large diameter portion and a part of an outer peripheral face of the first small diameter portion are substantially aligned in the axial direction of the pivot.

3. The fuel tank check valve according to claim 1, wherein the pivot is integrally formed with the cylindrical member, and the shaft hole is provided with the flap.

4. The fuel tank check valve according to claim 1, wherein the cylindrical member includes a support column portion projecting in a direction along a shaft line of the cylindrical member from an edge portion forming the opening, and the pivot is integrally formed with the support column portion in a tangent direction relative to the cylindrical member.

5. The fuel tank check valve according to claim 1, wherein the shaft hole has a long hole extending in a direction orthogonal to the flap when the opening is closed.

6. The fuel tank check valve according to claim 1, wherein the torsion coil spring includes one extending end portion abutting against an outer periphery of the cylindrical member, and another extending end portion abutting against an outer face of the flap.

7. The fuel tank check valve according to claim 1, wherein the first small diameter portion, the large diameter portion, the second small diameter portion, and the block portion are integrally formed as one member,
    the second small diameter portion is coaxially arranged with the first small diameter portion, and
    the second small diameter portion includes an inclined portion at one end thereof such that a projection length of the second small diameter becomes shorter toward a center of the cylindrical main member.

8. A fuel tank check valve, comprising:
a cylindrical member defining a flow channel for a fluid;
a flap axially supported on the cylindrical member through a pivot in order to open and close an opening on a fuel tank side of the cylindrical member; and
a torsion coil spring including a coil portion mounted on the pivot to urge the flap in a closing direction,
wherein the pivot includes a large diameter portion around which the coil portion is wound, and a first small diameter portion projecting into a shaft hole provided in either one of the cylindrical member or the flap,
the first small diameter portion is adjacent to the large diameter portion, and is disposed by being off-centered to a side where the torsion coil spring presses against the pivot by a reaction force of an urging force to the flap relative to the large diameter portion,
the cylindrical member includes a support column portion projecting in a direction of a shaft line of the cylindrical member from one end side forming the opening, and the pivot is integrally formed with the support column portion in such a way as to face a tangent direction relative to the cylindrical member, and
the pivot is formed in such a way as to extend toward right and left lateral sides from the support column portion, the first small diameter portion is formed at one end, a second small diameter portion coaxial with the first small diameter portion is formed at another end, and the flap includes a pair of arms wherein the shaft hole is formed.

9. A fuel tank check valve, comprising:
a cylindrical member defining a flow channel for a fluid;
a flap axially supported on the cylindrical member through a pivot in order to open and close an opening on a fuel tank side of the cylindrical member; and
a torsion coil spring including a coil portion mounted on the pivot to urge the flap in a closing direction,
wherein the pivot includes a large diameter portion around which the coil portion is wound, and a first small diameter portion projecting into a shaft hole provided in either one of the cylindrical member or the flap,
the first small diameter portion is adjacent to the large diameter portion, and is disposed by being off-centered to a side where the torsion coil spring presses against the pivot by a reaction force of an urging force to the flap relative to the large diameter portion,
the cylindrical member includes a support column portion projecting in a direction of a shaft line of the cylindrical member from one end side forming the opening, and the pivot is integrally formed with the support column portion in such a way as to face a tangent direction relative to the cylindrical member, and
a stopper restricting a fully open position of the flap is provided in the support column portion.

10. A fuel tank check valve, comprising:
a cylindrical member defining a flow channel for a fluid;
a flap axially supported on the cylindrical member through a pivot in order to open and close an opening on a fuel tank side of the cylindrical member; and
a torsion coil spring including a coil portion mounted on the pivot to urge the flap in a closing direction,
wherein the pivot includes a large diameter portion around which the coil portion is wound, and a first small diameter portion projecting into a shaft hole provided in either one of the cylindrical member or the flap,
the first small diameter portion is adjacent to the large diameter portion, and is disposed by being off-centered to an outer peripheral face of the large diameter portion extending from a side facing the cylindrical member to a side facing an inside of the cylindrical member in an axial direction so that the torsion coil spring presses against the first small diameter portion when the torsion coil spring shifts to a side of the first small diameter portion in the axial direction of the pivot, and
the outer peripheral face of the large diameter portion and a part of an outer peripheral face of the first small diameter portion are positioned on a same surface in the axial direction of the pivot.

* * * * *